United States Patent

Wellhausen et al.

[15] 3,654,566

[45] Apr. 4, 1972

[54] VIDEO CROSS BAR DISTRIBUTOR

[72] Inventors: Hans Wellhausen; Georg S. Licht, both of Hamburg, Germany

[73] Assignee: GmbH Fernseh, Darmstadt, Germany

[22] Filed: Nov. 6, 1969

[21] Appl. No.: 874,601

[52] U.S. Cl. ..................................330/124, 330/30, 330/51

[51] Int. Cl. ..........................................................H03f 3/68

[58] Field of Search ....................328/152, 153, 154; 330/30, 330/51, 124; 335/108, 112

[56] References Cited

UNITED STATES PATENTS 2,794,121 5/1957 Bjornson..............................328/152

2,849,703 8/1958 Bindon et al.......................328/153 X

*Primary Examiner*—Roy Lake
*Assistant Examiner*—Lawrence J. Dahl
*Attorney*—Michael S. Striker

[57] ABSTRACT

At the intersection of shielded input cross bars and shielded output cross bars variable gain amplifiers are provided whose gain is externally changeable from zero to a maximum. The variable gain amplifiers comprise a buffer stage designed to keep the input impedance constant regardless of gain changes, and a switching amplifier stage having the variable gain and having an output impedance which is low when the amplifier gain exceeds zero and high when the gain is zero. A mounting arrangement for mounting the components involved is also disclosed.

10 Claims, 2 Drawing Figures

Inventor:
Hans Wellhausen
Georg S. Licht by [signature]
Attorney

Inventor:
Hans Wellhausen
Georg S. Licht
by
Attorney

VIDEO CROSS BAR DISTRIBUTOR

BACKGROUND OF THE INVENTION

In the video industry, and particularly in video studios, it is often required that a plurality of video signal sources, as for example cameras, films, and tape recorders may be selectively supplied to a plurality of different outputs. In this type of arrangement it should be possible to connect each signal source selectively to none of the outputs or to one or more of the outputs.

In general, conventional arrangements of this type make use of relays. That is, distributors which comprise a mechanically rigid system of intersecting shielded bars, which constitute input lines and output lines, are supplied with relays at the points of intersection in order to allow interconnection of an input line with a desired output line.

This type of relay cross bar distributor has a number of disadvantages. For example the impedance at the input side changes in dependence on the number of outputs to which the signal is being furnished. Further, distributors of this type may only be used for a limited number of inputs and outputs, since otherwise the mechanical arrangement becomes so physically large that different traveling times occur within the arrangement and also, unwanted reflections occur at the disconnected intersection point.

SUMMARY OF THE INVENTION

It is the object of this invention to furnish a cross bar distributor which does not have the above-mentioned drawbacks. Thus it is the object of this invention to furnish a cross bar distributor which may make use of a relatively large number of inputs and outputs, without exceeding an acceptable physical size and without requiring equalization circuits for equalizing the traveling time from inputs to selected outputs.

Thus the present invention comprises a first plurality of shielded bars constituting input lines, and a second plurality of shielded bars, intersecting said first plurality of shielded bars, said second plurality of shielded bars constituting output lines. It further comprises a plurality of amplifier means, each for interconnecting an input line to a corresponding output line, each of said amplifier means being electrically connected at one of said intersections. The amplifier means each comprise a buffer amplifier for maintaining a constant input impedance independent of the gain of the amplifier means. It further comprises a switching amplifier having a variable gain, adapted to assume values of from zero to a predetermined maximum gain. This gain is variable as a function of a control voltage furnished to said switching amplifier. Further, the switching amplifier has an output impedance which is low for switching amplifier gains greater than zero and high for switching amplifier gains which are substantially zero. The switching amplifier may for example be a feedback amplifier in order to achieve these values of output impedance. The distributor in accordance with this invention may also comprise an input amplifier connected in each input line in order to electrically match each signal source to the distributor arrangement both in respect to impedance and with respect to level. Further comprised may be a plurality of output amplifiers, one in each output line. The amplifier means may be constructed either by integrated circuits or with individual miniaturized elements, but in any case will be miniaturized amplifiers.

In this type of arrangement each input source is operated with constant electrical load, regardless of whether it is supplied to one or more outputs. Thus the difficulties mentioned above cannot arise. Further, the miniaturized amplifiers are so small that it is possible to built large distributor systems with many inputs and many outputs, without the appearance of differences in transit time, or undesired reflections within the arrangement.

In order to substantially prevent cross talk, the switching amplifiers must be so constructed that a signal appearing at the input does not generate any output signal, that is that the gain of the amplifier is substantially zero, if the associated output has not been selected. Also of course cross talk from one bar to the other within the distributor arrangement must be prevented. This can be done relatively simply by a suitable grouping of the circuit elements and a corresponding selection thereof. In particular, the use of a multi-stage differential amplifier as switching amplifier is desirable. That is, it is desirable to use an amplifier which amplifies only signals appearing in opposite phase at its two inputs, while substantially suppressing signals of the same phase. This type of amplifier will also tend to suppress noise voltages introduced via the supply source. If differential amplifiers are used, it is required that at least the input side of the distributing system is arranged symmetrically.

A further advantage of a switching amplifier using a differential amplifier arrangement is that the change of gain from substantially zero to a predetermined value does not result in a change of the operating point, as would be the case for an unsymmetrical switching amplifier.

In any case the switching amplifiers must be so designed that a change in the control voltage, which changes the gain of the switching amplifier, does not disturb the linear relationship between the output voltage and input voltage. As long as a linear relationship between input and output voltage is maintained, the cross bar distributor of the invention may be used as a mixing console.

For the mechanical design of the arrangement of this invention, it is desirable that each input amplifier and the amplifier means associated with it, that is the amplifier means forming the connection between it and the possible output lines associated with it, are mounted on a substantially rectangular mounting plate, which has a first and second long edge and a first and second short edge. The connections for receiving the control voltages associated with each of the amplifiers are preferably mounted along one long edge of the mounting plate, while the output connections of the amplifier means are mounted along the second long edge. The mounting plates are mounted substantially parallel to each other on a base plate on which is also mounted a further mounting plate which has the output amplifiers mounted thereon. Connecting cables are also mounted along the base plate for interconnecting the output lines of the individual mounting plates with each other and with the corresponding output amplifiers. The lugs for the inputs and outputs of the whole arrangement may be mounted on a second plate, which in turn is arranged parallel to the base plate and at a short distance therefrom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
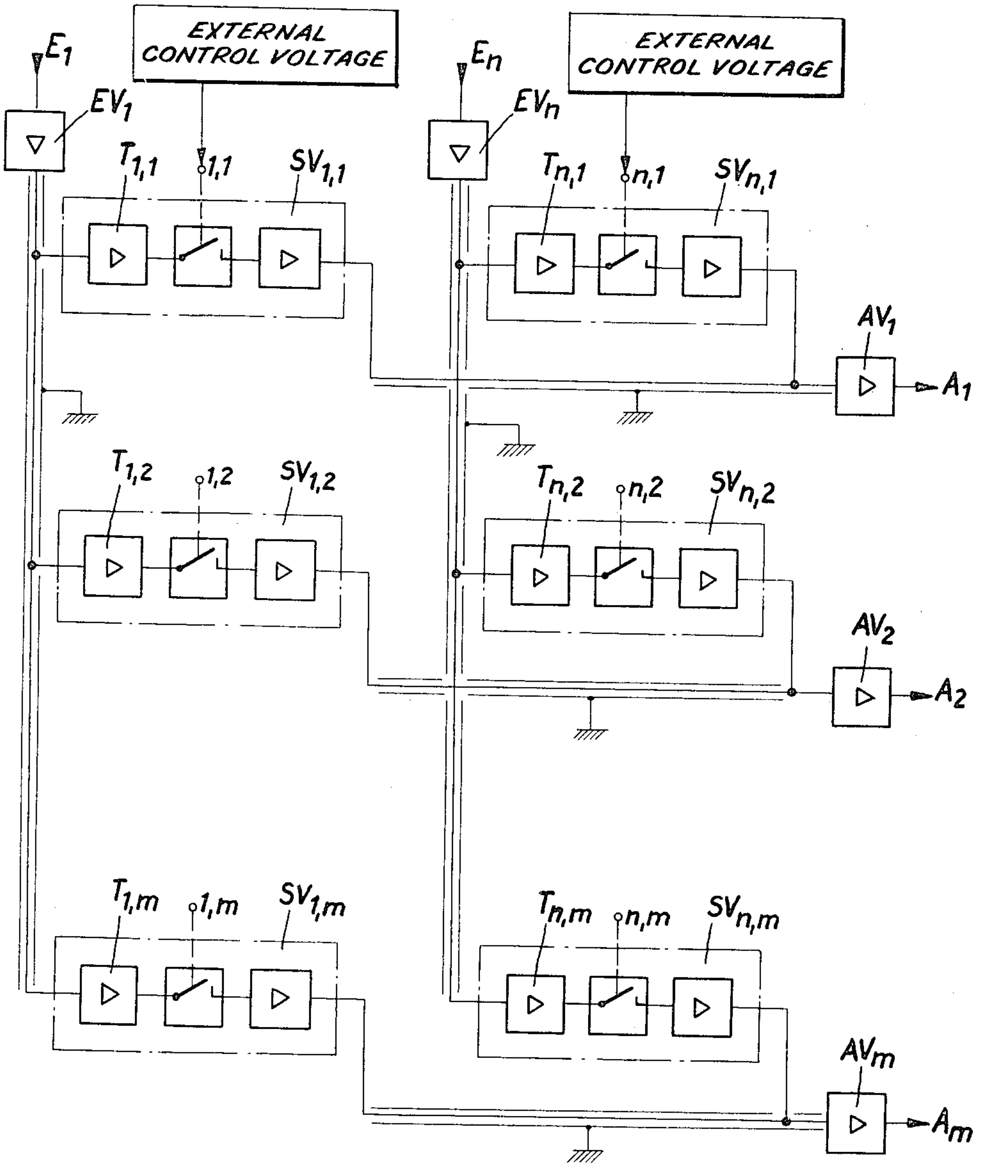
FIG. 1 shows a distributor system of the invention in block diagram form.

The preferred embodiment of this invention will now be described with reference to the drawing.

The inputs to the cross bar distributor of this invention are labeled $E_1 ... E_n$ in FIG. 1, while the outputs are labeled $A_1$, $A_2$,...$A_m$. Each input is connected via an input amplifier EV to a plurality of amplifier means including switching amplifiers $AV_{1,1}$, $SU_{1,2}$...$SV_{1,m}$, so that each input may be selectively supplied via the output amplifiers $AV_1$...$AV_m$ to the outputs $A_1$...$A_m$.

The miniaturized amplifier means in accordance with this invention each comprise the units labeled T with appropriate subscripts and the unit labeled SV with corresponding subscripts. Miniaturized amplifiers are used, whether these be constructed from individual miniaturized components or as integrated circuits. Each amplifier means thus comprises a buffer amplifier, the buffer amplifiers being labeled $T_{1,1}...T_{n,m}$, in order to keep the input impedance offered to the output signal of the input amplifier constant regardless of the gain of the switching amplifier which is here labeled $SV_{1,1}...SV_{n,m}$. At terminals 1,1; 1,2;...1,*m*...*n*,*m* the control voltages which vary the gains of the switching amplifiers are received. As previously stated the switching amplifiers are so designed that their gain is variable from zero to a predetermined maximum value by means of the externally supplied control voltage and the amplifiers have a low output impedance for a gain exceeding zero and a high output impedance when the gain is substantially zero.

Figure 2:
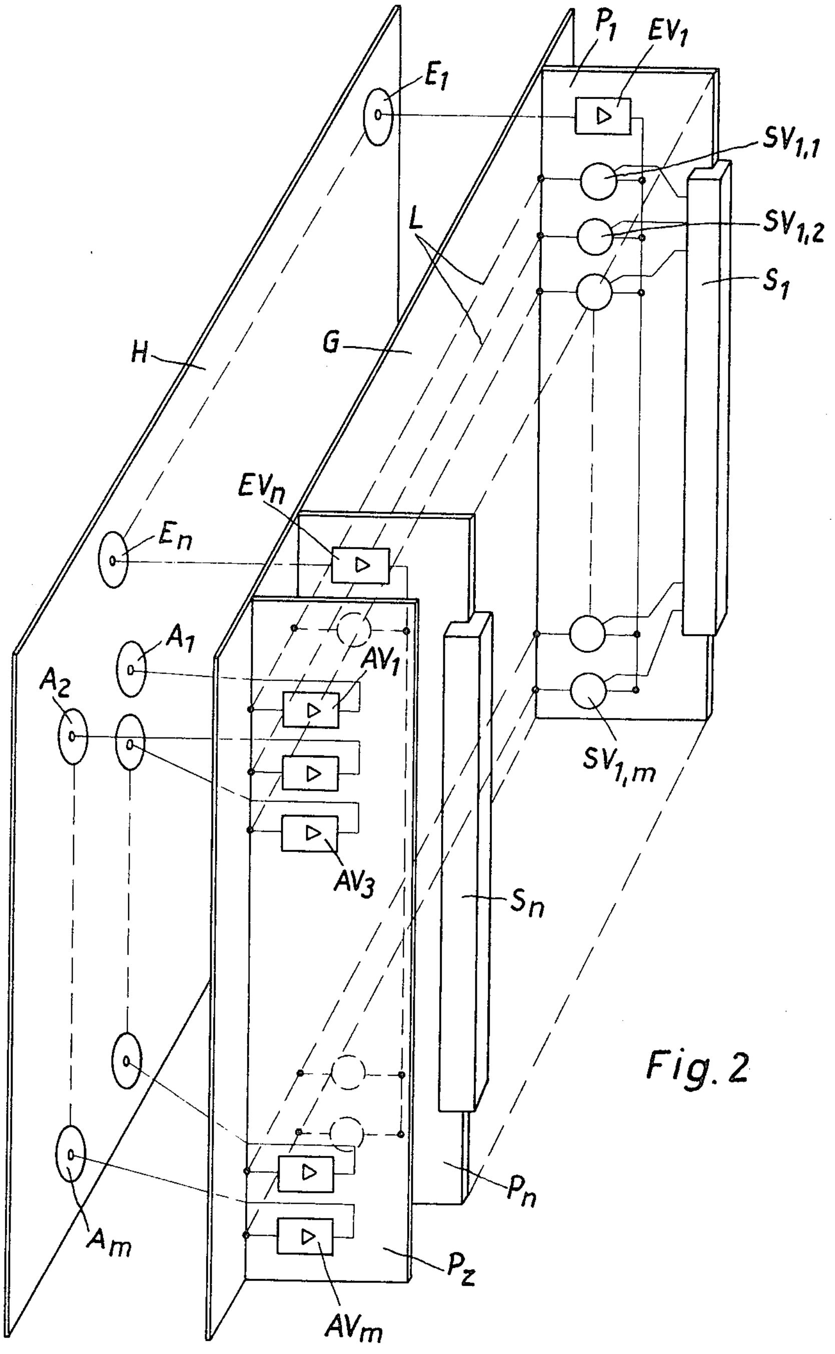
FIG. 2 shows the mechanical arrangement of the parts.

As shown in FIG. 2, each input amplifier and the amplifier means associated therewith are mounted on an individual mounting plate. For example the input amplifier $EV_1$ and the amplifier means containing switching amplifiers $SV_{1,1}...SV_{1,m}$ are mounted on a plate $P_1$. The plate is substantially rectangular shape and has a first and second long edge and a first and a second short edge. The connections for the control lines 1,1...*n*,*m* are supplied to the first long edge, namely the right-hand edge in FIG. 2 for connection to the output via plug board S. The output lines from the switching amplifiers are connected to the second long edge, namely the edge opposite the first long edge. A further mounting plate $P_z$ has the output amplifier AV mounted thereon. All of the mounting plates are connected to a common base plate G. The cables L running along the base plate G interconnect the output lines of the individual mounting plates to each other and to the corresponding output amplifiers.

The second plate H, spaced a short distance from plate G and substantially parallel thereto contains the plugs $E_1...E_n$ for the inputs and the plugs $A_1...A_n$ for the outputs which lead, respectively, to amplifiers EV and AV.

Thus a very compact arrangement is achieved which satisfies all the requirements which a video cross bar distributor must meet.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Video cross bar distributor, comprising, in combination, a plurality of input lines; a plurality of output lines; and a plurality of miniaturized amplifier means each connecting one of said output lines to one of said input lines when its gain substantially exceeds zero and disconnecting said output line from said input line when its gain is substantially equal to zero, each of said miniaturized amplifier means comprising: a buffer amplifier connected to said input line; and a switching amplifier connected to the output of said buffer amplifier, said switching amplifier having a gain variable from zero to a predetermined maximum in response to an external control signal, said switching amplifier having a low output impedance when said gain exceeds zero and a high output impedance when said gain of said switching amplifier is substantially equal to zero, whereby application of said control signal to a selected one of said miniaturized amplifier means connects a selected one of said output lines to a selected one of said input lines.

2. A distributor as set forth in claim 1, wherein said miniaturized amplifier means comprise integrated circuits.

3. A distributor as set forth in claim 1, wherein said miniaturized amplifier means comprise miniaturized individual components.

4. A distributor as set forth in claim 1, wherein each of said switching amplifiers is a feedback amplifier.

5. A distributor as set forth in claim 4, wherein said means for varying the gain of said switching amplifier between zero and a predetermined maximum gain value comprise means for furnishing a variable voltage for each of said switching amplifiers.

6. A distributor as set forth in claim 5, wherein each of said switching amplifiers comprises a multi-stage differential amplifier; and wherein at least the input lines are arranged symmetrically.

7. A distributor as set forth in claim 6, wherein the output voltage of each of said amplifier means is substantially linear with respect to the corresponding input voltage, independent of the gain.

8. A distributor as set forth in claim 7, further comprising a plurality of input amplifiers, one connected in each of said input lines; and a plurality of output amplifiers, one connected in each of said output lines.

9. A distributor as set forth in claim 8, further comprising a plurality of mounting plates, each substantially rectangular in shape, each having a first and second long edge and a first and second short edge; wherein an input amplifier and the associated amplifier means are mounted on each of said mounting plates, connections for receiving the variable voltage for each of said associated amplifier means being mounted along said first long edge, the output connections of each of said amplifier means being mounted on said second long edge; a further mounting plate for mounting the output amplifiers; a base plate, all of said mounting plates being mounted substantially at right angles to said base plate on said base plate, said base plate further having connecting cables for connecting the outputs of the individual mounting plates to one another and to the corresponding output amplifiers.

10. A distributor as set forth in claim 9, further comprising a second plate, said second plate having the plugs for the inputs and outputs mounted thereon, said second plate being positioned within a short distance from said base plate and substantially parallel thereto.

* * * * *